Patented Sept. 7, 1948

2,448,584

UNITED STATES PATENT OFFICE 2,448,584

CURED POLYESTER SYNTHETIC RUBBERS FORMED FROM DISECONDARY GLYCOLS

Carl J. Frosch, Chatham, N. J., assignor to Bell Telephone Laboratories, Incorporated, New York, N. Y., a corporation of New York No Drawing. Application November 24, 1943, Serial No. 511,591

8 Claims. (Cl. 260—75)

This invention relates to cured synthetic elastomers. The cured elastomers of the present invention are prepared by curing polyesters which are made up essentially of divalent hydrocarbon radicals joined into essentially linear chains by carboxylic ester linkages identical with those formed from secondary alcohol groups. When these polyesters contain no nonbenzenoid unsaturation or limited amounts of such unsaturation they are cured by intimately mixing them with benzoyl peroxide or other substances having a similar curing action and by heating the mixture to a temperature sufficient to cause rapid curing. When the polyesters contain larger amounts of non-benzenoid unsaturation they are cured by intimately mixing them with sulphur and heating to a curing temperature.

The strictly linear polyesters of high molecular weight containing no non-benzenoid unsaturation are prepared by the superesterification of a di-secondary glycol with a dicarboxylic acid or of a monocarboxy secondary monoalcohol with itself in a manner similar, for instance, to that described for crystalline polyesters in United States Patents 2,071,250 and 2,249,950. Polyesters containing non-benzenoid unsaturation may be prepared in the same manner as the fully saturated polyesters except that one or more of the ingredients of the reaction mixture from which they are prepared contains a properly limited amount of unsaturated carbon-to-carbon bonds.

Since the secondary alcohol groups are much less reactive than the primary alcohol groups, a substantially longer period of esterification is necessary for these substances than is required in the preparation of polyesters from di-primary glycols or from primary hydroxy acids. The products are viscous gums at room temperature.

To form cured elastomers from these polyesters, the polyesters are compounded by milling, preferably on cold rolls together with the curing agent. In order to impart a high modulus and tensile strength, finely divided reinforcing pigments are ordinarily milled with the polyester. Particularly suitable reinforcing pigments are the red oxide of iron known as "Mapico 297" and the ultra-fine precipitated calcium carbonate known as "Kalvan." The compounded polyester is heated in a mold to a temperature sufficient to effect curing.

The vulcanized elastomers produced by curing these polyesters are considerably superior in resistance to degradation at elevated temperatures in the presence of moisture as compared to elastomers formed by the vulcanization of polyesters produced from di-primary glycols such as ethylene glycol or from primary-secondary glycols such as isopropylene glycol. In order to preserve the resistance to hydrolytic degradation, the polyesters of the present invention are preferably prepared from dihydroxy hydrocarbons and dicarboxy hydrocarbons or from monohydroxy monocarboxy hydrocarbons. However, any reactants will be suitable for forming polyesters for the purposes of the present invention, if in the chains between their functional groups they contain no linkages substantially less resistant to hydrolysis than carboxylic ester groups derived from secondary alcohol groups.

Any monovalent hydrocarbon substituent on the carbon atoms of the glycols carrying the hydroxyl groups will impart the desired resistance to hydrolysis. The substituent, however, should not be one which would prevent the formation of an ester. Therefore, the carbon atom of the substituent which is bonded to glycol chain should not be a member of an aromatic ring. In the most suitable glycols, the substituent is an alkyl group, preferably a methyl, ethyl, propyl, butyl, amyl or hexyl group.

Among the suitable glycols for the preparation of these polyesters may be mentioned symmetrical dimethyl ethylene glycol, 2,3 hexanediol, 2,3 pentanediol and 1,10 dimethyl decamethylene glycol. Among the suitable saturated dicarboxylic acids may be mentioned succinic, adipic, pimelic, suberic, azelaic, sebacic and phthalic acids.

The tensile strength possessed by the cured polyester is dependent upon the degree of linear growth achieved by the polyester prior to curing. With the strictly linear polyesters prepared from glycols and dicarboxylic acids containing no non-benzenoid unsaturation or from monohydroxy monocarboxylic acids containing no non-benzenoid unsaturation, the degree of linear growth is measured directly by the molecular weight of the polyester, since theoretically each molecule is made up of a single long chain.

There is a relatively sharp increase in the tensile strength of the cured polyesters when the molecular weights of the saturated linear polyesters from which they are prepared achieve and exceed molecular weights in the vicinity of 8,000 to 10,000 as estimated by the Staudinger viscosity method. Linear polyesters of such molecular weights ordinarily possess intrinsic viscosities in chloroform of at least 0.4. Linear polyesters will also possess such moleclar weights if they contain an average of at least 500 or 600 atoms in their linear chains, or if they contain at least 98 ester groups for each 100 total ester, hydroxyl and carboxyl groups in the polyester (98 per cent of theoretical complete esterification). The saturated polyesters should possess degrees of linear growth of this order to permit effective curing.

Polyesters formed from reactants, at least one of which contains olefinic unsaturation, will possess these high degrees of linear growth associated with high tensile strength if they contain at least 98 ester groups per 100 total ester, hydroxyl and carboxyl groups in the polyester. When the polyesters contain substantial amounts of olefinic unsaturation it is not always possible to achieve such high degrees of linear growth. However, since only moderate tensile strength is required for some purposes, it is possible to use unsaturated polyesters of somewhat lower degrees of linear growth.

In order to produce high degrees of esterification, the reactants from which the polyesters are produced must be subjected to a prolonged heating operation under conditions such as to remove the reaction by-products continuously and effectively, as described, for instance, in United States Patents 2,071,250 and 2,249,950. The reaction by-products are most effectively removed by bubbling an inert gas, such as dry, oxygen-free hydrogen, through the reaction mixture until esterification or condensation has proceeded to the desired degree of completion, with or without the application of reduced pressure. Since unsaturated dicarboxylic acids are more available than unsaturated glycols or unsaturated hydroxy acids, unsaturation is most easily introduced into the polyesters by substituting unsaturated dicarboxylic acids, such as maleic, fumaric, itaconic, mesaconic, muconic or dihydromuconic acid, for a portion of the saturated acid in a glycol and dicarboxylic acid mixture.

As the amount of unsaturation in the polyester increases, the vulcanization with benzoyl peroxide or similar substances becomes more and more sensitive until ultimately it becomes extremely difficult or even impossible to control the curing reaction so as to produce rubber-like materials instead of substances of low elongation.

In defining the theoretical amount of unsaturation in a polyester produced from bifunctional reactants, it is convenient to assume that the esterfication takes place without cross-linking at the double bonds and to define the degree of unsaturation as the ratio of the number of unsaturated carbon-to-carbon bonds to the number of atoms in the linear chain of the average theoretical linear polyester molecule. It is difficult to prevent overcure with benzoyl peroxide or similar substances when the amount of unsaturation exceeds five olefinic bonds per 400 atoms in the theoretical linear chain of the polyester, calculated as described above.

When the unsaturation exceeds five olefinic bonds per 400 atoms in the linear chain, more suitable rubbers are prepared when the polyester is cured with sulphur. Sulphur vulcanization is effective to produce rubbers of good reversible elasticity up to degrees of unsaturation corresponding to about thirteen olefinic bonds per 400 atoms in the linear chain. As the unsaturation is increased substantially above this point, the reversible elasticity is decreased to an undesirably low value.

When the polyester is prepared from saturated glycols and a mixture of saturated dicarboxylic acids and dicarboxylic acids containing olefinic unsaturation, the most effective range of unsaturation for curing with benzoyl peroxide and similar substances occurs when the unsaturated acid constitutes less than about 10 mol per cent of the total dicarboxylic acid mixture. When it is desired to take advantage of the increased rate of cure due to the presence of unsaturation, it is desirable to have at least 1 mol per cent of unsaturated dicarboxylic acid present. For curing with sulphur, the most satisfactory range of unsaturation occurs when the unsaturated acid constitutes between about 10 mol per cent and about 25 mol per cent of the total dicarboxylic acid mixture.

When large amounts of unsaturation are present in the reaction mixture from which the polyester is formed the reaction mixture will ultimately gel because of cross-linking at the double bonds. The reaction must be interrupted before substantial gelation has occurred so that the resulting polyester will be sufficiently fluid or plastic to permit compounding with sulphur and other substances. To secure maximum tensile strength in the cured polyester, the reaction should be carried out under conditions which will insure the maximum degree of esterification before the reaction is interrupted. When the polyester is to be cured with sulphur, the cross-linking reaction can be suppressed by incorporating an antioxidant in the reaction mixture.

Those polyesters curable with benzoyl peroxide are compounded by intimately mixing them with a small amount of benzoyl peroxide and heating them to a temperature above 105° C. and preferably to a temperature between about 120° C. and 140° C. The amount of benzoyl peroxide used for curing will vary between about 0.5 per cent and 5 per cent by weight, the amount depending primarily upon the amount of unsaturation, but also upon the nature of the saturated ingredients. Although benzoyl peroxide has been found the most effective cross-linking agent, other acyl peroxides, such as lauryl peroxide, have also been found particularly effective. Certain other organic peroxides are sufficiently effective to render them usable as curing agents, particularly when the polyesters contain unsaturation.

Those polyesters which contain a sufficient amount of unsaturation for effective curing with sulphur are compounded by intimately mixing them with sulphur and the other compounding ingredients and heating them to a curing temperature. It is ordinarily desirable to include in the compound a vulcanization accelerator, such as tetramethylthiuram disulphide. The amount of sulphur and accelerator is not critical. Ordinarily between about 1 per cent and about 3 per cent by weight of sulphur and between about 1 per cent and 3 per cent by weight of accelerator will be suitable.

The most suitable temperatures for curing with sulphur will ordinarily be found to lie between about 120° C. and about 150° C. The time required for curing will vary with the degree of unsaturation, the amount of sulphur, the kind and amount of accelerator and the curing temperature.

The cured elastomer compounds produced by the present invention will ordinarily contain finely divided reinforcing pigments, such as the colloidal carbon-blacks (when cured with sulphur), the red oxide of iron known as "Mapico 297," or the ultra-fine precipitated calcium carbonate known as "Kalvan." The optimum amounts of "Mapico 297" are between 100 and 150 per cent by weight; the optimum amounts of "Kalvan" are between about 40 per cent and 75 per cent by weight. Other compatible rubber compounding ingredients such as other mineral fillers, softeners, plasticizers, paraffin waxes and, in the case of sulphur cured compounds, antioxidants, may be added to produce the desired physical properties.

The following specific examples will illustrate the manner in which the present invention may be practiced:

Example 1

A mixture containing 4.7 grams of symmetrical dimethyl ethylene glycol (5 mol per cent excess) and 10.1 grams of sebacic acid together with .001 gram of zinc chloride as a catalyst was placed in an enclosed glass reaction vessel having its lower portion maintained at 190° C. and its upper portion cooled by exposure to the atmosphere so as to provide partial reflux of the glycol while allowing the water vapor to escape. Dry, oxygen-free hydrogen was bubbled continuously through the reaction mixture. After 160 hours the product was a permanently non-crystalline, extremely viscous, amber liquid. This viscous liquid was milled on cold rolls for 10 minutes with 4 per cent by weight of finely divided benzoyl peroxide and 100 per cent by weight of the red oxide of iron known as "Mapico 297." The compounded gum was cured in a mold in the form of a sheet 50 mils thick for 5 minutes at 120° C. The cured elastomer possessed good tensile strength and reversible elasticity and retained its tensile strength and elasticity for a substantially longer time when exposed to water at 80° C. than did corresponding elastomers formed from glycols containing primary alcohol groups.

Example 2

A cured elastomer was formed as described in Example 1 except that 5.9 grams of succinic acid were used in place of the 10.1 grams of sebacic acid. Curing was carried out with 6 per cent by weight of benzoyl peroxide in place of 4 per cent by weight. The cured elastomer was comparable to that produced in Example 1 in tensile strength, reversible elasticity and resistance to hydrolysis.

Example 3

A mixture containing 55.5 mol per cent 2,3 butylene glycol (25 mol per cent excess), 43.2 mol per cent distilled sebacic acid and 1.3 mol per cent maleic anhydride, together with a small amount of zinc chloride as a catalyst, was placed in a closed glass reaction vessel maintained at 200° C., and a slow stream of dry, oxygen-free hydrogen was bubbled continuously through the mixture. A packed reflux column, maintained at 110° C., was attached to the reaction vessel. After 20 hours, the reflux column was removed and the pressure in the system was reduced to about 6 millimeters of mercury, the temperature being maintained at 200° C. and the bubbling of hydrogen being continued. Butylene glycol distilled over rapidly, and an increase in the viscosity of the product was apparent within a short time. At the end of 20 hours of heating under the vacuum, the product was removed and found to be an exceedingly viscous, permanently non-crystalline liquid. About 1 per cent by weight of finely divided benzoyl peroxide was thoroughly milled into a portion of this product. Seventy-five per cent by weight of the precipitated calcium carbonate known as "Kalvan" was then added to the gum on the rolls and the milling was continued until the pigment was well dispersed. This mixture was then cured under pressure in the form of a thin sheet for 10 minutes at 125° C. A product was obtained which had an excellent tensile strength, reversible elasticity and resistance to hydrolysis.

Example 4

A mixture containing 363.3 grams of commercial sebacic acid, 19.6 grams of maleic anhydride and 223.5 grams of symmetrical dimethyl ethylene glycol, together with 9.4 grams phenyl alpha naphthylamine as an anti-oxidant and .04 gram zinc chloride as a catalyst, was heated for 20 hours at 200° C. in a reaction vessel equipped with a reflux condenser maintained at 110° C., while dry, oxygen-free hydrogen was continuously bubbled through the reaction mixture. The reflux condenser was removed at the end of 20 hours and the heating was then continued for an additional 20 hours under an absolute pressure of 6 millimeters of mercury, the bubbling of hydrogen being continued. At the end of this time the reaction product was a partly gelled, extremely viscous liquid. A portion constituting 100 parts of this material was thoroughly milled with 75 parts Kalvan, 3 parts sulphur and 1 part tetramethyl thiuram disulphide. This mixture was cured for 30 minutes at 150° C. in the form of a thin sheet. The product possessed good tensile strength, elasticity and resistance to hydrolysis.

Although the invention has been described in terms of its specific embodiments, certain modifications and equivalents will be apparent to those skilled in the art and are intended to be included within the scope of the present invention which is to be limited only by the reasonable scope of the appended claims.

What is claimed is:

1. A cured synthetic elastomer obtained by curing, with between about .5 per cent and about 5 per cent by weight of benzoyl peroxide, a viscous, gummy 2,3 dihydroxybutane-dicarboxyhydrocarbon polyester, the average molecules of which polyester contain at least 98 ester groups per 100 ester, hydroxyl and carboxyl groups, said polyester containing less than five olefinic bonds per 400 atoms in the linear ester chains calculated by assuming no cross-linking between molecules at the unsaturated bonds, said polyester containing no nox-benzenoid unsaturation.

2. The cured elastomer described in claim 1 wherein the dicarboxyhydrocarbon is a dicarboxyalkane.

3. The cured elastomer described in claim 1 wherein the dicarboxyhydrocarbon is sebacic acid.

4. The cured elastomer described in claim 1 wherein the dicarboxyhydrocarbon is succinic acid.

5. The cured elastomer described in claim 1 wherein the polyester is a 2,3 dihydroxybutane-dicarboxyalkane-dicarboxyolefin polyester.

6. The cured elastomer described in claim 1 wherein the polyester is a 2,3 dihydroxybutane-dicarboxyalkane-maleic acid polyester.

7. A cured synthetic elastomer obtained by curing, with between about .5 per cent and about 5 per cent by weight of an organic peroxide, a viscous, gummy glycol-dicarboxyhydrocarbon polyester wherein the glycol is a straight chain alkane having both a hydroxyl substituent and an alkyl substituent on each terminal carbon atom, the average molecules of said polyester containing at least 98 ester groups per 100 ester, hydroxyl and carboxyl groups, said polyester containing less than five olefinic bonds per 400 atoms in the linear ester chains calculated by assuming no cross-linking between molecules at the unsaturated bonds, said polyester containing no other non-benzenoid unsaturation.

8. A cured synthetic elastomer obtained by curing, with between about .5 per cent and about 5 per cent by weight of an organic peroxide, a viscous, gummy glycol-dicarboxyhydrocarbon polyester wherein the two hydroxyl groups of the glycol are secondary alcohol groups and wherein the glycol is a dihydroxyhydrocarbon in which the two carbon atoms carrying the hydroxyl groups each have substituted thereon a monovalent aliphatic hydrocarbon radical, the average molecules of said polyester containing at least 98 ester groups per 100 ester, hydroxyl and carboxyl groups, said polyester containing less than five olefinic bonds per 400 atoms in the linear ester chains, calculated by assuming no cross-linking between molecules at the unsaturated bonds, said polyester containing no other non-benzenoid unsaturation.

CARL J. FROSCH.

REFERENCES CITED

The following references are of record in the file of this patent:

UNITED STATES PATENTS

| Number | Name | Date |
|---|---|---|
| 1,890,668 | Bradley | Dec. 13, 1932 |
| 2,333,639 | Christ et al. | Nov. 9, 1943 |
| 2,035,314 | Hansley et al. | Mar. 24, 1936 |
| 2,282,827 | Rothrock | May 12, 1942 |
| 2,315,613 | Frosch | Apr. 6, 1943 |
| 2,322,756 | Walder | June 29, 1943 |
| 2,388,319 | Fuller | Nov. 6, 1945 |
| 2,394,909 | Gleason | Feb. 12, 1946 |

FOREIGN PATENTS

| Number | Country | Date |
|---|---|---|
| 540,168 | Great Britain | Oct. 8, 1941 |

OTHER REFERENCES

Olsson, Z. physik. Chem., Vol. 125, p. 243-50 (1927), abstracted C.A. Vol. 21, p. 1581 (1927).